United States Patent
Wiss et al.

(10) Patent No.: US 6,894,998 B1
(45) Date of Patent: May 17, 2005

(54) ASYNCHRONOUS PACKET PROCESSING USING MEDIA STREAM FUNCTIONS

(75) Inventors: Patrik Wiss, Stockholm (SE); Ulf Ekstedt, Saltsjobaden (SE); Ola Dagberg, Stockholm (SE); Gunnar Larsson, Tumba (SE); Lars-Göran Petersen, Tumba (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 826 days.

(21) Appl. No.: 09/695,250

(22) Filed: Oct. 25, 2000

(51) Int. Cl.$^7$ .............................................. H04L 12/66
(52) U.S. Cl. ..................................... 370/352; 370/466
(58) Field of Search ............................... 370/466, 352, 370/353, 354, 355, 356, 442, 458, 465, 468, 470, 471, 472, 474, 477; 710/62, 65, 68, 69, 70, 71

(56) References Cited

U.S. PATENT DOCUMENTS

| | | | | |
|---|---|---|---|---|
| 5,519,640 A | * | 5/1996 | Ganesan et al. | 709/236 |
| 5,996,018 A | * | 11/1999 | Duault et al. | 709/234 |
| 6,370,127 B1 | * | 4/2002 | Daraiseh et al. | 370/328 |
| 6,381,238 B1 | * | 4/2002 | Hluchyj | 370/352 |

FOREIGN PATENT DOCUMENTS

| | | |
|---|---|---|
| EP | 0 669 742 A2 | 8/1995 |
| EP | 1 006 742 A1 | 6/2000 |

OTHER PUBLICATIONS

International Preliminary Examination Report mailed in corresponding PCT Application No. PCT/SE01/02334.

* cited by examiner

*Primary Examiner*—Bob A. Phunkulh
(74) *Attorney, Agent, or Firm*—Nixon & Vanderhye P.C.

(57) ABSTRACT

A media stream system (140) processes plural media streams (148), e.g., speech streams or speech channels. The system comprises plural processors (146), each of which execute one or more plural types of media stream processing functions (147). A switch function (144) routes packets of the plural media streams to a sequence of the plural processors whereby the plural types of media stream processing functions are sequentially performed relative to the packets. A packet size for the packets is chosen to minimize overhead load on at least one of the plural processors without causing undue delay for a packet awaiting processing by the at least one of the plural processors. In an example non-limiting implementation, the packet size for a packet of media information is chosen to be 160 octets, consecutive packets of a same media stream being separated by a packet repetition interval which is 20 milliseconds.

57 Claims, 7 Drawing Sheets

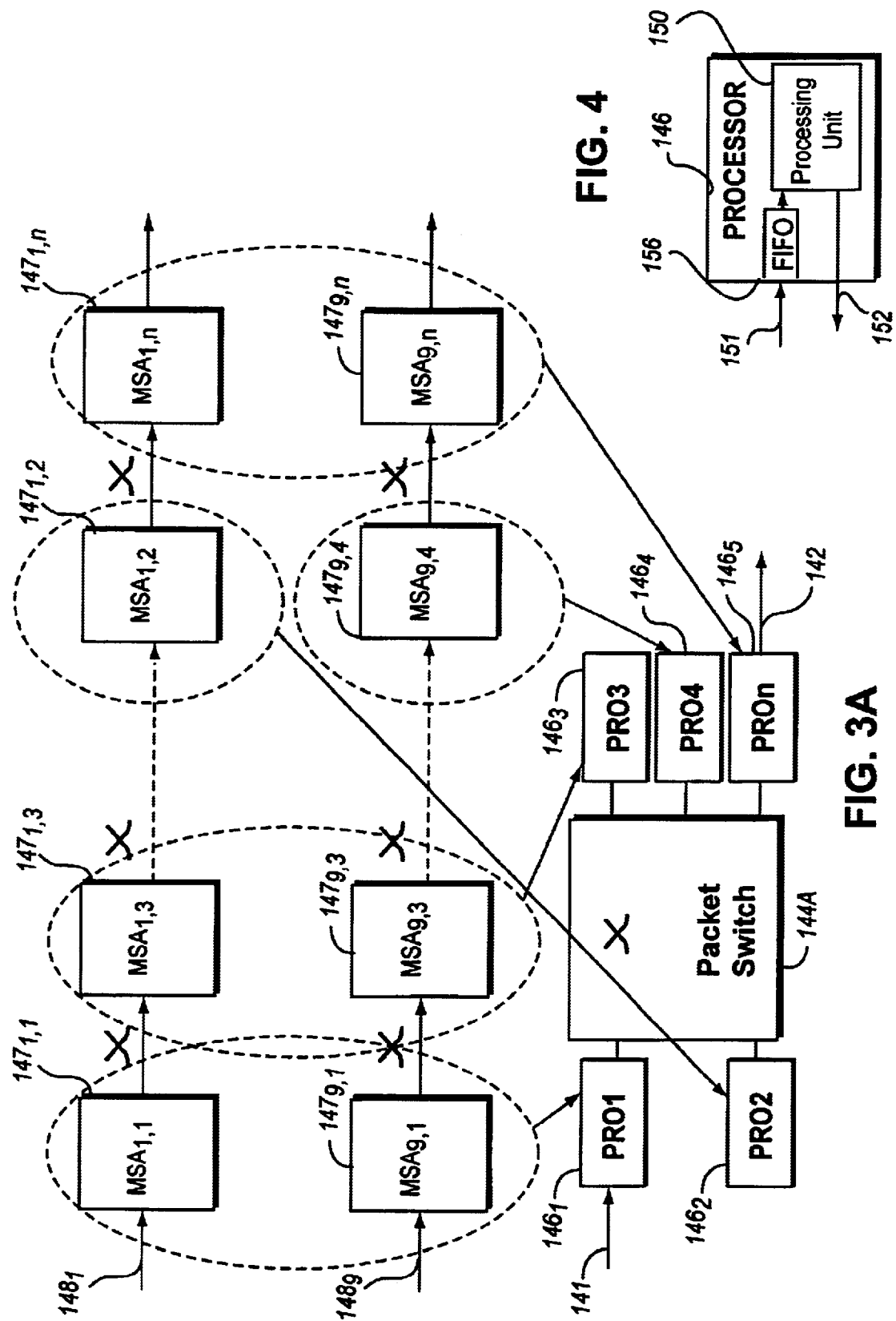

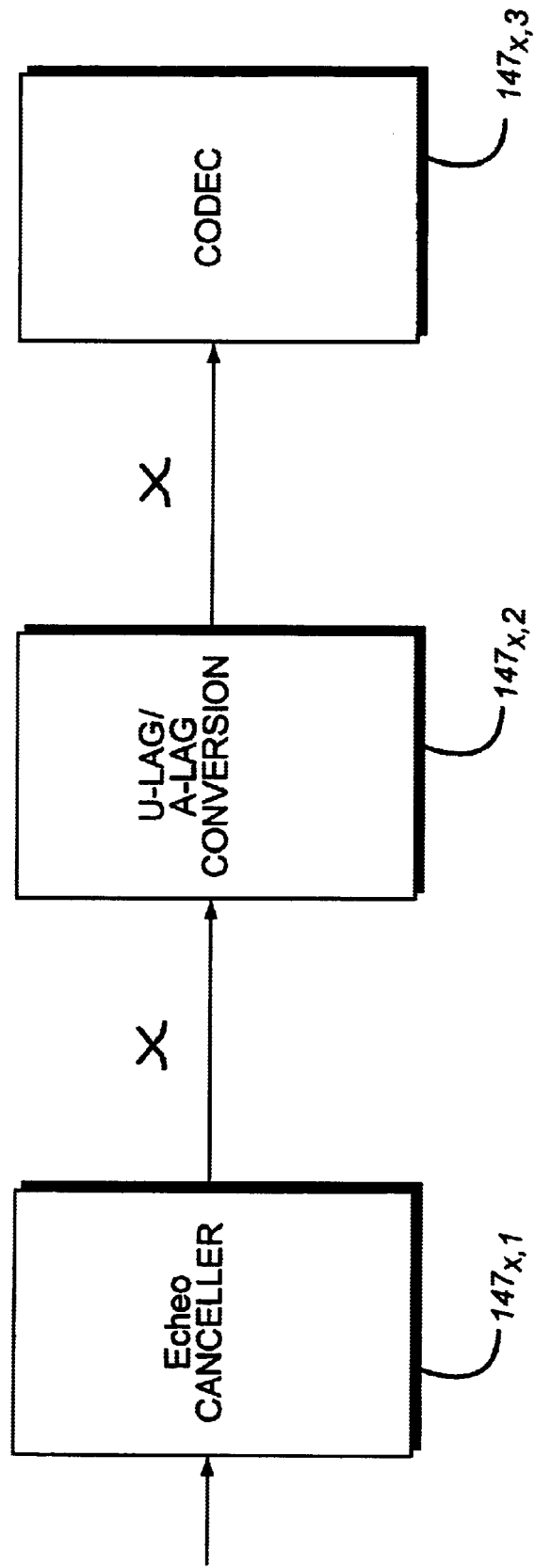

ASYNCHRONOUS PACKET PROCESSING USING MEDIA STREAM FUNCTIONS

BACKGROUND

1. Field of the Invention

The present invention pertains to the processing of streams of information in a telecommunications node or network.

2. Related Art and Other Considerations

Time Division Multiplexing (TDM) is a technique for transmitting streams of information (e.g., speech information) in time slots repeated at regular intervals. As one example, a 64 kbps uncompressed speech stream has a slot in each of consecutive 125 microsecond TDM time frames. In accordance with a European standard know as GSM (Global System for Mobile communications), the TDM time frames are 20 milliseconds in duration, while in another standard known as G.729 the TDM time frames are 10 milliseconds in duration.

At various nodes of a telecommunication network the time slots of the speech streams may undergo processing, with speech processing resources being allocated for a specific speech (voice) channel when the time slot is received. It is generally preferably to perform the speech processing using software rather than hardware, particularly in view of the continuous development of new speech algorithms. Yet deterministic resource allocation in the node may lead to insufficient usage of the speech processing resources.

Allocation of speech processing resources at a node for every time slot can undesirably consume processor resources, and exact a disproportionate amount of processor overhead relative to the small amount of data that is included in a speech time slot. This is especially true if the networks which interface with the node are packet based.

Illustrating the foregoing, FIG. 1 describes a prior art TDM technique wherein seven different 64 kbps speech streams have their respective one octet time slots repeated every 125 microseconds. In particular, FIG. 1 shows a TDM frame 18 which includes time slots $20_1$–$20_7$ for the respective seven speech streams. Moreover, in FIG. 1 the first time slot $20_1$ (e.g., for the first speech stream) is expanded in representative manner to show what happens during the time duration of the time slot $20_1$ with respect to the speech information carried in time slot $20_1$, including processor operations performed with respect to the speech information carried in time slot $20_1$ during the time slot $20_1$.

In FIG. 1, time $21_1$ (which is a first portion of the time slot $20_1$) is required for the processor to resume execution of its processing function, such processing function having been suspended after processing of the time slot in the previous frame. Once execution of the processing function is resumed, during time $22_1$ the processing function actually processes the speech data carried in time slot $20_1$, sending the processed speech data out in an outgoing time slot $30_1$ of an outgoing frame 28. Time $23_1$ is required to suspend operation of the processing function. Time $24_1$ reflects the fact that the resume time $21_1$, processing time $22_1$, and suspend time $23_1$ typically do not entirely fill the time slot $20_1$. Moreover, it should be understood that the resume time $21_1$, processing time $22_1$, and suspend time $23_1$ may vary from processing function to processing function, and further that the durations of these times can depend upon other factors such as the nature of the incoming speech data (e.g., active or silence speech).

FIG. 1 also illustrates how processor resources might be wasted during call setup and call tear down. For example, if time slot $20_5$ is allocated to a call which is undergoing call setup or call tear down, time slot $20_5$ is reserved but the processing resources allocated thereto are unused until the called party picks up the telephone or the calling party gets tired of waiting.

Thus, times $21_I$ and $23_1$ of time slot $20_1$ are times of processing overhead. Since time slot $20_1$ is representative potentially of all time slots in frame 18, such processing overhead can occur for each time slot carrying actual voice data. Times $24_1$ and time slot $20_5$ depict examples of wasted processor resources as may occur when there is no actual voice data during call setup or call tear down.

FIG. 2 shows an example prior art node 40 which performs processing on seven speech streams such as those illustrated in FIG. 1. The seven speech streams are received in TDM frames at node 40 on line 41. After processing at node 40, the speech streams are output on line 42. The node 40 includes a TDM circuit switch 44 which interconnects processors $46_1$ through $46_n$. Each processor executes one or more speech processing functions, referenced as media stream processing functions or media stream applications (MSA). For example, processor $46_1$ hosts media stream processing functions $47_{1,1}$ through $47_{7,1}$ ($MSA_{1,1}$ through $MSA_{7,1}$), which process data with respect to the respective seven speech streams $48_1$ through $48_7$. Similarly, processor $46_3$ hosts media stream processing functions $47_{1,3}$ through $47_{7,3}$ ($MSA_{1,3}$ through $MSA_{7,3}$). In the notation of FIG. 2, the first subscript for a media stream processing function 47 refers to the particular media stream which it processes, while the second subscript for a media stream processing function 47 distinguishes the function from other functions performed with respect to the same media stream.

In node 40 of FIG. 2, the TDMA circuit switch 44 transfers time slots between the media stream processing functions 47, and thereby serves to allocate the number of time slots to the processors 46 which host the media stream processing functions 47. The number of time slots allocated to any processor 46 is based on that processor's capacity with respect to the worst case processing requirements of the particular media stream processing function 47 which it executes. For example, if the expected worst case per slot processor utilization time for a particular processor with respect to its media stream processing function 47 is 15.7 microseconds ($\mu s$), then only seven time slots can be allocated. Even then, the allocation of seven time slots results in a waste of 15.1 microseconds processing time [125 $\mu s$–(7× 15.7 $\mu s$)]. Since the allocation is typically based on worst case MSA processing time, performance of the media stream processing functions in better case scenarios results in even more wasted processor capacity.

Thus, typically allocation of time slots to media streaming handling processors within a multi-processor node is unfortunately based on worst case scenarios. Worst case premised time slot allocation results in inefficient use of processor resources, but is necessary in a system which synchronously handles time slots. Moreover, as evidenced from the situation depicted in FIG. 1, even within times slots there is time lost to processor overhead and potentially idle processor resources.

What is needed, therefore, and an object of the present invention, is a technique for which facilitates prudently allocating of time slots in a node which processes media streams.

BRIEF SUMMARY

A media stream system processes plural media streams, e.g., speech streams or speech channels. The system comprises plural processors, each of which execute one of plural types of media stream processing functions. A switch function routes packets of the plural media streams to a sequence of the plural processors whereby the plural types of media stream processing functions are sequentially performed relative to the packets. The types of media stream processing functions can include functions such as the following: speech coding; speech decoding; echo cancellation; tone sender; tone receiver; DTMF sender; DTMF receiver; conference call device (CCD); announcement machine; FAX modem; voice recognition; and U-lag/A-lag conversion; an interfacing functionality to an external network (such as TDM, ATM, IP and Frame Relay networks); video codec (which, e.g., processes video and/or video clips), text processing (which converts text to voice or text to video), a modem for either circuit switched or packet switched data.

A packet size for the packets is chosen to minimize overhead load on at least one of the plural processors without causing undue delay for a packet awaiting processing by the at least one of the plural processors. In one example non-limiting illustrated implementation, the packet size for a packet of media information is chosen to be 160 octets. In the example non-limiting illustrated implementation, consecutive packets of a same media stream are separated by a packet repetition interval which is 20 milliseconds.

The switch function asynchronously routes the packets of the plural media streams to a sequence of the plural processors. In each processor there is a queue for temporarily storing a packet received while the processor performs its media stream processing function relative to another packet.

In differing embodiments, the switch function comprises one of a packet switch and a cell switch, or one of a packet-based and a cell-based network.

Because of the packet size afforded by the present invention, the number of events, both in the user plane and the control plane, are lower than if traditional speech time slots were to be handled one by one as in the prior art. This results in lower processing overhead, and therefore lower processor load. Advantageously, the software need not switch or change context as often.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A is a diagrammatic view of a system which processes media streams in accordance with an example embodiment of the present invention, and which uses a packet switch or cell switch to perform a switching function.

FIG. 4 is a diagrammatic view of an example configuration of a processor of the node of FIG. 3.

FIG. 6 is a diagrammatic view showing an illustrative sequence of media stream applications which can be performed for a speech stream.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 3:
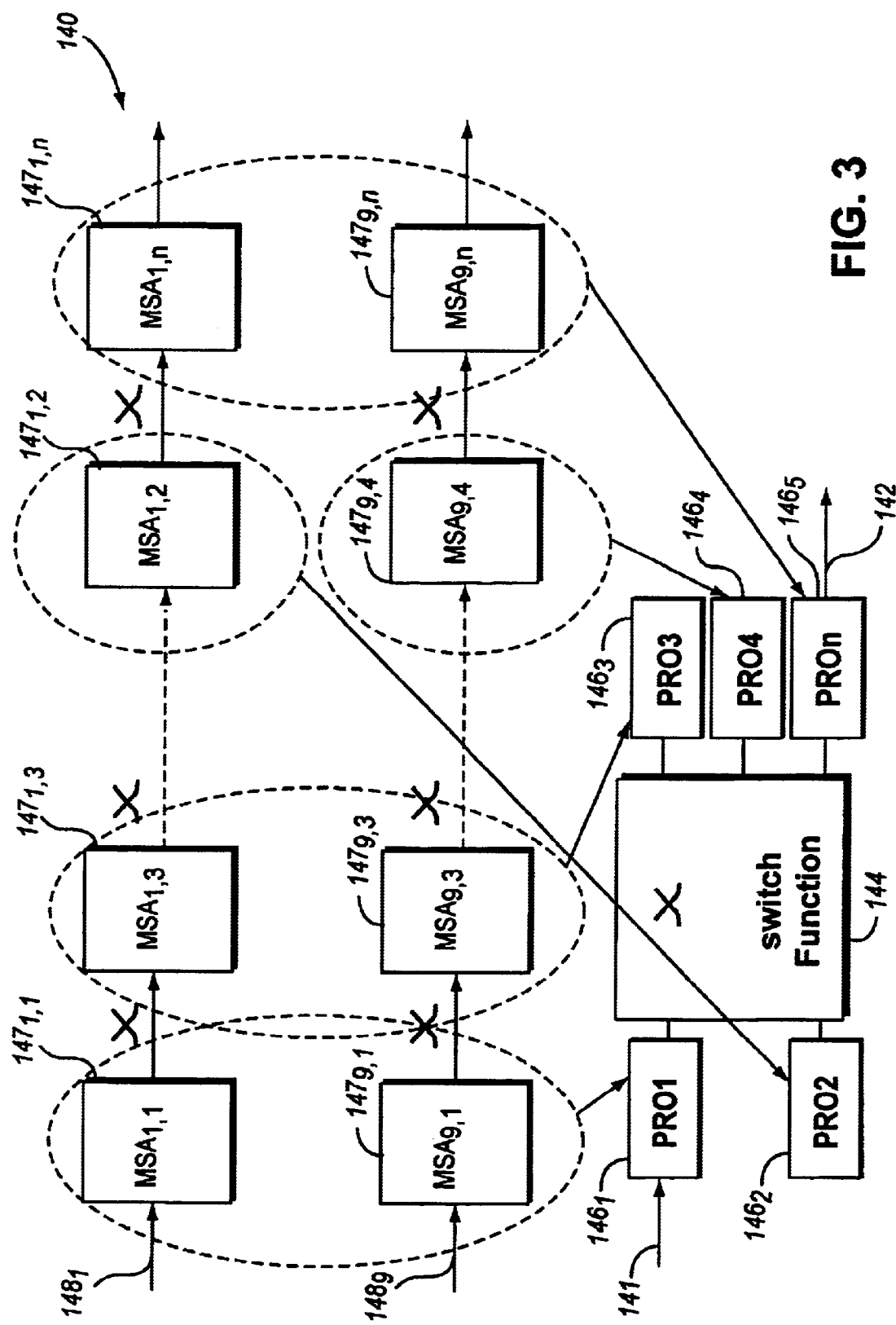
FIG. 3 is a diagrammatic view of a generic system which processes media streams in accordance with an example embodiment of the present invention.

FIG. 3 shows a media stream system 140 which processes plural media streams. The media stream system 140 can be situated at or comprise a node of a network, such as a telecommunications network, for example. Alternatively, media stream system 140 can itself comprise a network. In one particular direction of stream flow, the media stream system 140 receives the plural media streams on line 141, processes one or more of the plural media streams, and outputs the media streams on line 142.

Figure 3B:
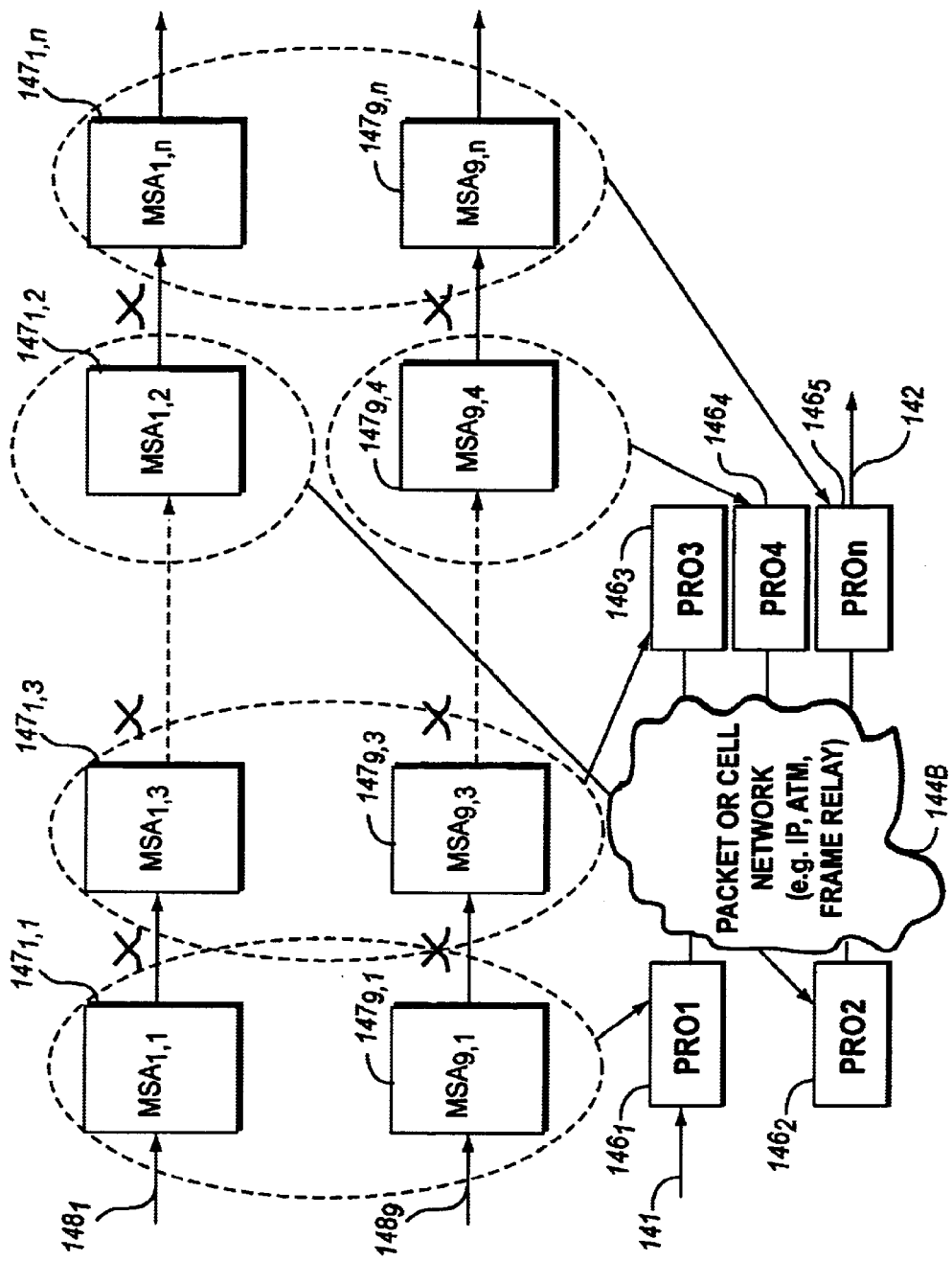
FIG. 3B is a diagrammatic view of a system which processes media streams in accordance with an example embodiment of the present invention, and wherein a switching function is performed by a packet or cell network.

The heart of media stream system 140 is a switch function, generically illustrated as switch function 144 in FIG. 3. FIG. 3A shows an embodiment in which the switch function is a switch 144A which can be a packet switch, cell switch, or any node-included switch suitable for routing packets of media information as hereinafter described. FIG. 3B, on the other hand, shows an embodiment in which the switch function is a packet-based or cell-based network 144B, such as (for example) an Internet Protocol (IP) network, an ATM network, or Frame Relay network. For sake of simplicity and inclusion of all embodiments, the switch function is hereinafter referred to as "switch 144". The switch 144 has differing ports (in the case of FIG. 3A) or nodes (e.g., in the case of FIG. 3B) thereof connected to differing processors 146. For sake of illustration, five such processors $146_1$–$146_5$ are shown in FIG. 3.

The media stream system 140 of the present invention processes media stream packets, the size of the packets being particularly chosen according to packet size criteria of the invention. Choice of packet size in accordance with the present invention results in more economical use of the processors 146, which has various attendant advantages. One such advantage is that media stream system 140 can handle a greater number of media streams, if desired. For example, whereas the prior art node 40 of FIG. 2 handled seven streams, the illustrative example media stream system 140 of FIG. 3 handles nine media streams $148_1$ through $148_9$.

Each processor 146 executes one or more media stream processing functions or 4 media stream applications (MSAs) 147, there being several different types of media stream processing functions. For example, processor $146_1$ hosts media stream processing functions $147_{1,1}$ through $147_{9,1}$ ($MSA_{1,1}$ through $MSA_{9,1}$), which process data with respect to the respective nine media streams $148_1$ through $148_9$. Similarly, processor $146_3$ hosts media stream processing functions $147_{1,3}$ through $147_{9,3}$ ($MSA_{1,3}$ through $MSA_{9,3}$).

Figure 2:
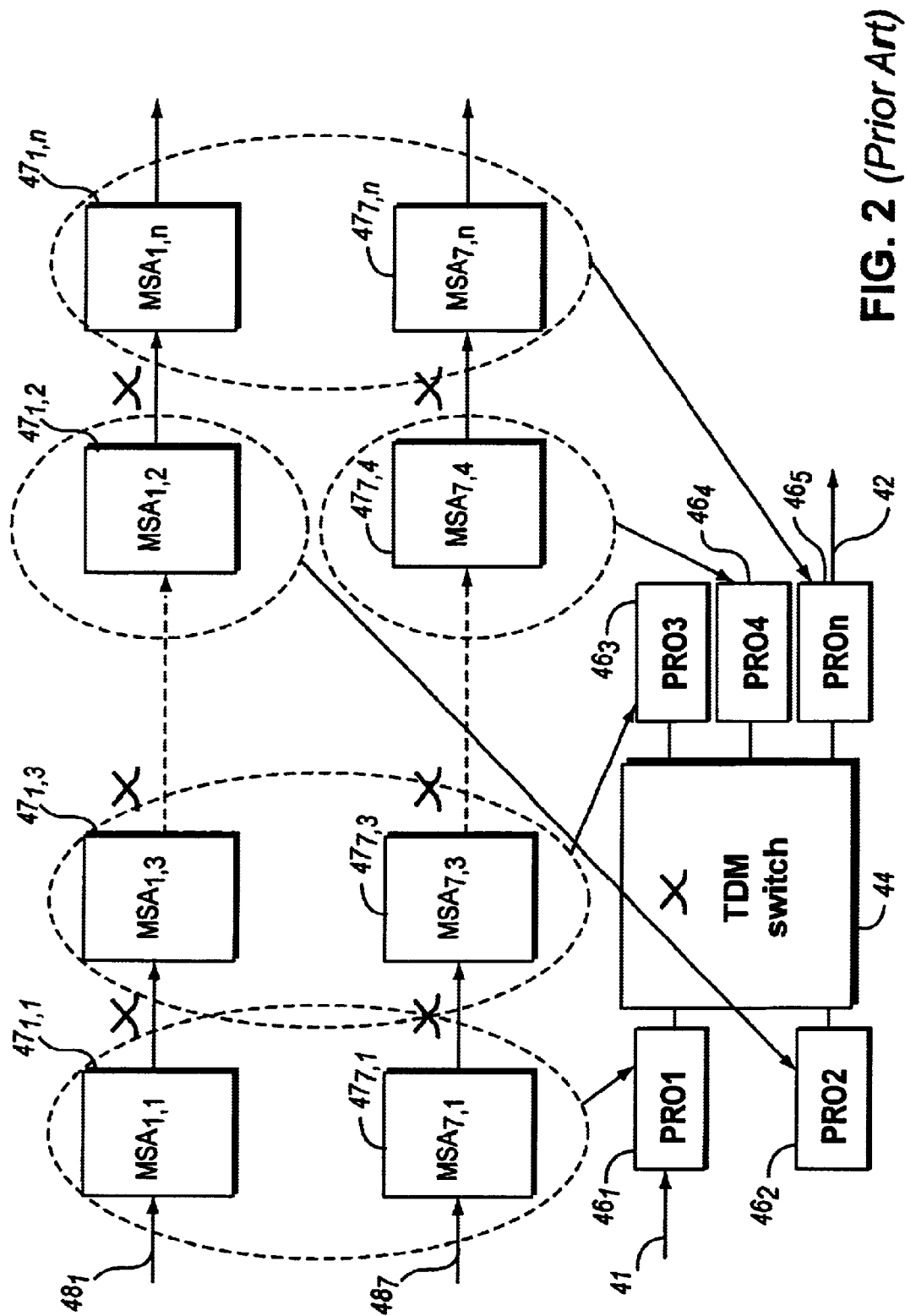
FIG. 2 is a diagrammatic view of a prior art node which processes TDM speech time slots.

As in FIG. 2, in the notation of FIG. 3 the first subscript for a media stream processing function 147 refers to the particular media stream which it processes, while the second subscript for a media stream processing function 147 distinguishes the function from other functions performed with respect to the same media stream.

A generic one of the processors 146 is shown in FIG. 4 as comprising a processing unit 150. The processing unit 150 executes one or more of the media stream processing functions 147. In one embodiment, the processors 146 can be digital signal processors (DSPs). Other types of units for executing the media stream processing functions 147 are within the scope of the present invention.

Switch 144 asynchronously routes each of the packets of the plural media streams received at system 140 to a sequence of the plural processors 146, so that the types of media stream processing functions 147 hosted at that sequence of processors 146 are sequentially performed relative to the packets. Accordingly, FIG. 4 shows processor 146 as being connected to an output port/node of switch 144 by line 151 over which a packet-to-be processed by processing unit 150 is received. Further, after a packet has been processed by processing unit 150, it is output on line 152 for transmission back to switch 144. Switch 144 is thus in a position to route the packet to yet another processor 146 for further processing, or out of system 140 should processing be completed.

As mentioned above, switch 144 asynchronously routes each of the packets of the plural media streams to a sequence of the plural processors 146 comprising system 140. By asynchronous is meant that there is no established time relationship between the reception and/or discharge of packets at one processor 146 with the reception and/or discharge of packets at another processor, or no timed relation in the routing of packets by switch 144 to plural processors 146. Rather, when a processor 146 has completed its processing, it is sent to switch 144, and switch 144 then routes the packet to another processor (or out of system 140) as soon as possible. Thus, the time between incoming packets is not the same as the time between outgoing packets for different streams, since (among other factors) different streams may require different processing time.

Several packets belonging to different media streams can arrive almost simultaneously at a processor 146 while that processor is already involved in exeucting a media stream function 147 in its processing unit 150. In view of the asynchronous nature of the routing of packets by switch 144, the processors 146 have a buffer register (e.g., preferably a first-in, first-out (FIFO) register) 156 functionally positioned between the input line 151 from switch 144 and their processing unit 150. The FIFOs 156 serve to hold any packets received at a processor 146 which, in view of the asynchronous nature of system 140, are awaiting completion of processing of a preceding packet by the processing unit 150 of the processor 146 prior to being processed themselves. In other words, the FIFOs 156 compensate for random arrival of packets within the given packet repetition rate due to introduced jitter. The packet(s) awaiting in FIFO 156 thus may experience some delay in gaining access to processing unit 150 so that the corresponding media stream application 147 can be executed with respect thereto. Accordingly, there can be some variation in the packet repetition time for the outgoing packet.

Figure 5:
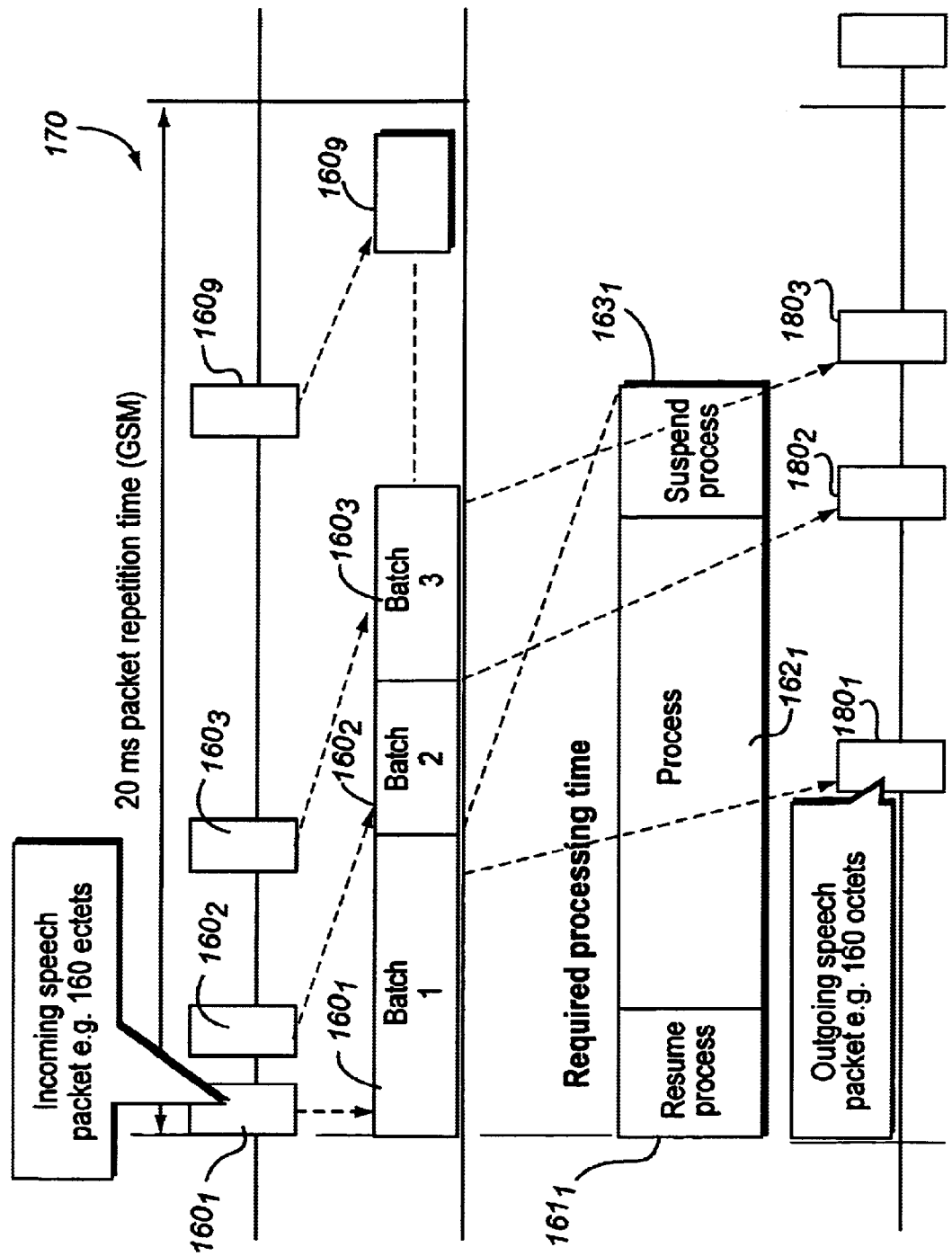
FIG. 5 is a diagrammatic view showing a media stream transmission technique according to an embodiment of the present invention.

As alluded to above, in accordance with one aspect of the present invention, the packet size for the media stream packets is chosen to minimize overhead load on a processor 146, without causing undue delay for a packet awaiting processing by that processor. FIG. 5 illustrates the nature and advantages of the packet size of this aspect of the present invention.

As shown in FIG. 5, in one example, non-limiting embodiment of the present invention the packet size for a packet of media stream information is chosen to be 160 octets. In view of its size, each packet of media stream information is also referred to as a "batch". FIG. 5 further shows nine such packets $160_1$ through $160_9$ being included in a packet repetition interval 170. Preferably the packet repetition interval is 20 milliseconds. Thus, consecutive packets of a same media stream (e.g., media stream $148_1$) are separated by the packet repetition interval 170 (e.g., the packet $160_1$ shown in FIG. 5 is followed 20 milliseconds by another packet of the same media stream). The packet size and packet repetition interval 170 of the FIG. 5 embodiment is merely one example, it being recognized that other packet sizes and other lengths for the packet repetition interval 170 can be utilized in other embodiments.

Certain ones of the packets 160 in FIG. 5 particularly packets $160_1$ through $160_3$ and packet $160_9$, are illustrated also as "batch 1", "batch 2", "batch 3", and "batch 9", respectively. Moreover, FIG. 5 shows an enlargement of packet $160_1$ for sake of illustrating the corresponding processing time required by a representative one of the processors 146 for performing its media stream application 147 relative to packet $160_1$. The required processing time for packet $160_1$ first includes a resume process time $161_1$ which is required to resume execution of the media stream application 147 performed by processor 146. The required processing time for packet $160_1$ also includes an actual processing time $162_1$, during which time the processor 146 processes the media stream application relative to packet $160_1$. After actual processing of the packet $160_1$ by the media stream application 147 is completed, the required processing time for packet $160_1$ further includes a suspend time $163_1$ to afford the processor 146 an opportunity to suspend action of the media stream application 147 in anticipation of handling yet another packet.

Each processor 146 has a certain overhead load associated with the execution of the media stream applications 147 which it hosts. The overhead load includes operations of resuming and suspending execution of a media stream processing function for packets of different media streams. With reference to FIG. 5, for example, the overhead load for a processor includes its activities of resuming execution of its media stream application (which has an overhead resume time $161_1$) and of suspending execution of its media stream application (which has an overhead resume time $163_1$) after the packet $160_1$ has been processed.

Figure 1:
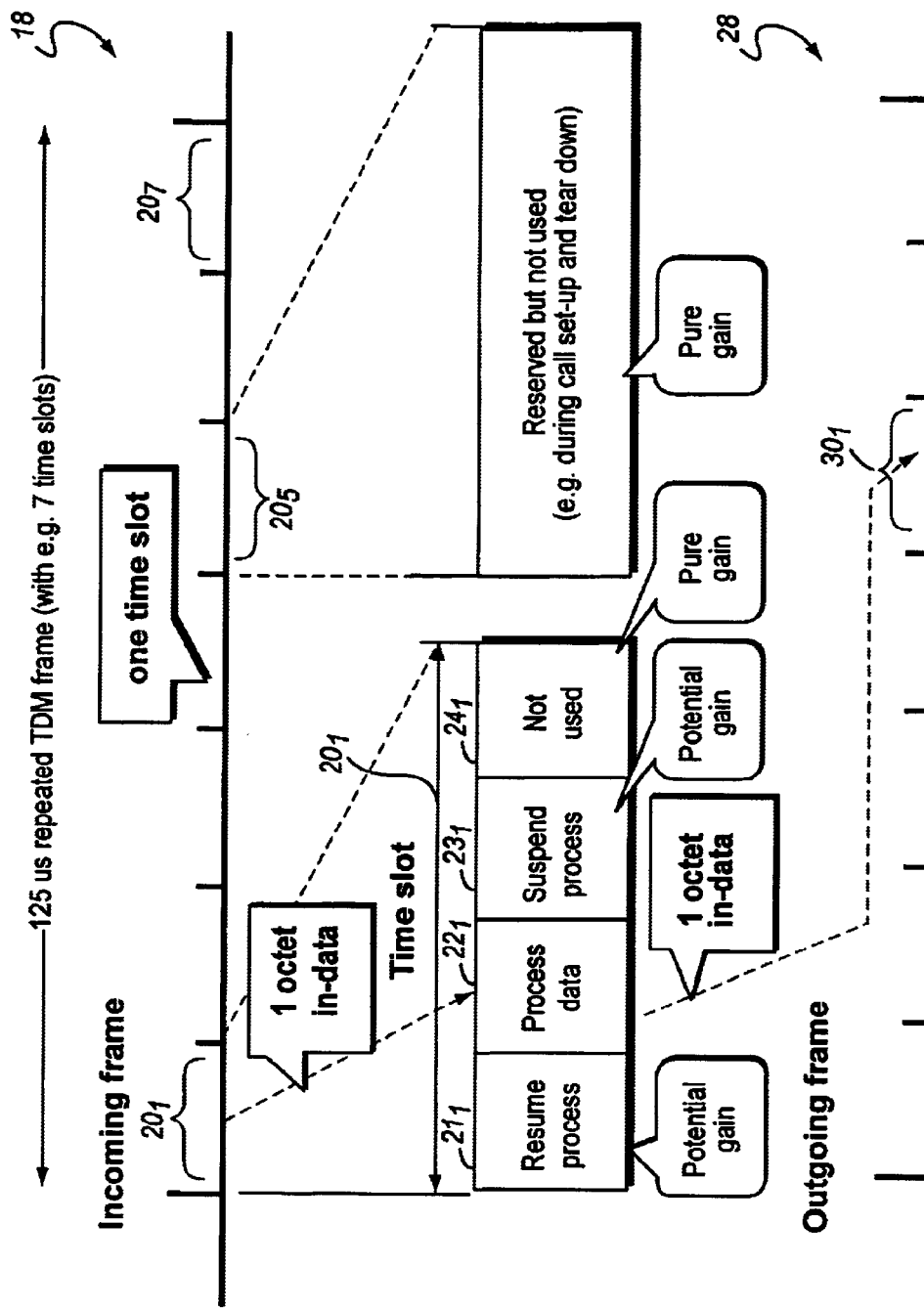
FIG. 1 is a diagrammatic view showing a prior art TDM transmission technique.

By choosing 160 octets as the size for each media stream packet, less time is consumed by the processor 146 in resuming and suspending execution of the media stream application 147 than is the case, for example, in FIG. 1. In other words, the time marked in FIG. 1 as "potential gain" can be utilized for processing rather than for resuming and suspending operations. Moreover, the overhead load for a processor is more effectively spread over a larger time base of information per media stream, thereby economizing processor execution and therefore allowing greater use of processing resources. For example, in the embodiment of FIG. 4 nine media streams $148_1$–$148_9$ are handled by system 140, as opposed to a lesser number when packet sizes are smaller than the 160 octets of the present invention.

Thus, one aspect of the invention is grouping or formatting of the media stream data so that each processor, upon executing its MSA, does so for 160 consecutive times slots, rather than for just one time slot. Therefore, there are not resume and suspend periods for the processor between handling each time slot. Advantageously, in view of the greater efficiency, the processor can now handle more traffic, e.g., more media streams and/or more MSAs.

After a packet is processed by a media stream application 147 executed by one of the processors 146, that packet (of 160 octets) is output by the processor (e.g., on line 142) to switch 144. In FIG. 5, output packet $180_1$ corresponds to the packet $160_1$ whose processing was just described.

FIG. 3 illustrates how switch 144 routes packets of the various media streams 148 to a sequence of different processors 146. For example, packets of media stream $148_1$ are routed first to media stream application $147_{1,1}$ hosted at processor $146_1$. Upon completion of the processing by media stream application $147_{1,1}$, the packet of the first media stream is returned to switch 144, so that switch 144 can route the packet to media stream application $147_{1,3}$ which is hosted at processor $146_3$. As further shown by FIG. 4, the packets of the first media stream are eventually routed to processor $146_2$ where execution of media stream application $147_{1,2}$ is performed, and then via switch 144 to processor $146_n$ where media stream application $147_{1,n}$ is performed.

The sequence of processors 146 to which packets of differing media streams are routed can differ. In contrast to the sequence for packets of the first media stream as described in the previous paragraph, in FIG. 4 it is seen that the packets of the ninth media stream $148_9$ are routed in a different sequence. In this regard, the packets of the ninth media stream $148_9$ are routed to processor $146_4$ for performance of media stream application $147_{9,4}$ prior to being routed to processor $146_n$, instead of being routed to processor $146_2$ prior to being routed to processor $146_n$. Thus, for differing media streams there can be a differing sequence of processor routings, which can mean a difference in the types of media stream applications that are performed, and a difference in the order of performance of the media stream applications.

As mentioned above, plural types of media stream processing functions can be, and typically are, performed relative to one or more media streams at system 140. The plural types of media stream processing functions include one or more of the following: speech coding; speech decoding; echo cancellation; tone sender; tone receiver; DTMF sender; DTMF receiver; conference call device (CCD); announcement machine; FAX modem; voice recognition; U-lag/A-lag conversion; an interfacing functionality to an external network (such as TDM, ATM, IP and Frame Relay networks); video codec (which, e.g., processes video and/or video clips), text processing (which converts text to voice or text to video), a modem for either circuit switched or packet switched data.

In one example, non-limiting mode of the invention, the media streams are speech streams (e.g., channels of speech data). FIG. 6 provides an illustrative depiction of a sequence of media stream applications which can be performed for a speech stream x in a PLMN in a downlink direction (e.g., the call originating in a PSTN). In the example mode of FIG. 6, the switch 144 first routes the packet for speech stream x to a first processor whereat media stream application $147_{x,1}$ is performed; then to a second processor whereat media stream application $147_{x,2}$ is performed; then to a third processor whereat media stream application $147_{x,3}$ is performed. In the illustrated scenario of FIG. 6, media stream application $147_{x,1}$ is an echo canceller; media stream application $147_{x,2}$ is a U-lag/A-lag conversion process; media stream application $147_{x,3}$ is a coder/decoder (CODEC).

As mentioned above, in the present invention packets or batches of media stream information are processed and routed asynchronously, e.g., as fast as possible. However, system 140 may interconnect to another system which, by contrast, is synchronous. Such synchronous system could be, for example, an exchange in PSTN (such as, for example, an Ericsson AXE 10 exchange). In order to interface with a synchronous system, an interface device such as an exchange terminal (e.g., an E1 board) is provided at an edge of system 140 to enable the packets of media stream information handled by system 140 to regain synchronization with the outside world. There are various ways in which the resynchronization can be accomplished. One example, non-limiting way in which such regaining of synchronization can be accomplished is to buffer the outgoing stream of packets on the interface board and clock out the packets in typical TDM manner (e.g., the stream into the buffer is asynchronous and the stream clocked out from the buffer is synchronous). Thus, synchronization to circuit based TDM or circuit emulation networks is performed as close as possible to the edge of system 140, e.g., as the output of the last media stream function 147. Such time alignment is necessary largely only when interconnecting with circuit based TDM or circuit emulation networks. Media streams coming from a circuit based TDM or circuit emulation network are converted to a packet (e.g., batch) in the asynchronous domain of the present invention at, e.g., the first media stream function 147 of the system (e.g., a media stream function which serves as an interface functionality to an external network). Such conversions can be to ATM, Internet Protocol (IP), and to Frame Relay, for example.

Thus, in the case of connection to a circuit based TDM or circuit emulation network, the media stream functions $147_{1,1}$ through $147_{1,9}$ of FIG. 3 could perform, for example, a conversion of packet size suitable for the present invention upon receipt of the packets on line 141 from the outside world. The media stream functions $147_{1,n}$ through $147_{9,n}$ of FIG. 3, on the other hand, could perform re-conversion of packet size and synchronization for interfacing to the outside world.

In case synchronization is not needed, the asynchronous batch processing can be made between media stream functions across a network, i.e., the packet switch is replaced by a packet or cell based network, e.g., IP, ATM, and frame relay. If Internet Protocol is utilized, no adjustment to packet length may be required, as the packet size of 160 octets can be utilized at a 20 ms frame repetition time.

"Circuit emulation" is a concept employed in ATM networks, where the characteristics of the TDM transmission is deployed in the user plane. By circuit emulation it is possible to transfer a real-time payload such as voice with TDM characteristics in an ATM network.

The present invention thus advantageously provides better utilization of expensive processor resources. For example, the invention provides a lowest delay only related to the load applied to the processors. The delay can be further decreased by not loading the processors to the maximum, and thus avoiding or decreasing queuing delay (e.g., in the FIFOs 156). Thus, the present invention enables attaining a trade off between delay and load.

The present invention also facilitates use of processors in accordance with statistical multiplexing. If a processor were to be overbooked (implying a greater utilization of processor resources), a lower quality of service (QoS) correlatively results. A lower QoS in this context means that randomly a speech packet can be lost. This has minor impact on the total voice quality, provided it affects different speech streams and the speech packet loss rate is tuned according to speech quality requirements.

Because of the packet size afforded by the present invention, the number of events, both in the user plane and the control plane, are lower than if traditional speech time slots were to be handled one by one as in the prior art. This results in lower processor overhead, and therefore lower processor load. Advantageously, the software need not switch or change context as often (e.g., a DSP need not change from processing one speech channel to another speech channel as often as in conventional practice).

By implementing time alignment (e.g., synchronization) only at the egress point of the system towards circuit switched or circuit emulated networks, no unnecessary delay is introduced in the call chain.

If packet networks are employed, only processing an FIFO queuing delay has to be considered in delay computations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A media stream system which processes plural media streams, each media stream comprising packets of media information, the system comprising:

plural processors, each of the plural processors executing at least one of plural types of media stream processing functions;

a switch function which routes the packets of the plural media streams to a sequence of the plural processors whereby the plural types of media stream processing functions are sequentially performed relative to the packets;

wherein a packet size for the packets is chosen to minimize overhead load on at least one of the plural processors without causing undue delay for a packet awaiting processing by the at least one of the plural processors.

2. The system of claim 1, wherein the packet size for a packet of media information is chosen to be 160 octets.

3. The system of claim 1, wherein consecutive packets of a same media stream being separated by a packet repetition interval.

4. The system of claim 3, wherein the packet repetition interval between consecutive packets of the same media stream is 20 milliseconds.

5. The system of claim 1, wherein the number of plural media streams is nine.

6. The system of claim 1, wherein the plural media streams are one of plural voice channels and plural video channels.

7. The system of claim 1, wherein the switch asynchronously routes the packets of the plural media streams to a sequence of the plural processors.

8. The system of claim 7, wherein for at least one of the plural processors there is a queue for temporarily storing a packet received while the at least one of the plural processors performs its media stream processing function relative to another packet.

9. The system of claim 1, wherein at least one of the plural processors is a digital signal processor (DSP).

10. The system of claim 1, wherein the plural types of media stream processing functions include at least one of the following: speech coding; speech decoding; echo cancellation; tone sender; tone receiver; DTMF sender; DTMF receiver; conference call device (CCD); announcement machine; FAX modem; voice recognition; and U-lag/A-lag conversion; an interfacing functionality to an external network (such as TDM, ATM, IP and Frame Relay networks); video codec, text processing, modem for either circuit switched or packet switched data.

11. A media stream system which processes plural media streams, each media stream comprising packets of media information, the system comprising:

plural processors, each of the plural processors executing at least one of plural types of media stream processing functions;

a switch function which routes the rackets of the plural media streams to a sequence of the plural processors whereby the plural types of media stream processing functions are sequentially performed relative to the packets;

wherein a packet size for the packets is chosen to minimize overhead load on at least one of the plural processors without causing undue delay for a packet awaiting processing by the at least one of the plural processors;

wherein the overhead load includes operations of resuming and suspending execution of a media stream processing function for packets of different media streams.

12. A media stream system which processes plural media streams, each media stream comprising packets of media information, the system comprising:

plural processors, each of the plural processors executing at least one of plural types of media stream processing functions;

a switch function which routes the packets of the plural media streams to a sequence of the plural processing whereby the plural types of media stream processing functions a sequentially performed relative to the packets;

wherein a packet size for the packet is chosen to minimize overhead load on at least one of the plural processors without causing undue delay for a packet awaiting processing by the at least one of the plural processors;

an interface device which connects the system to a network wherein the packets of the plural media streams are transmitted synchronously, wherein the interface device performs a synchronization with respect to the packets which have been asynchronously routed through the system.

13. The system of claim 1, wherein the switch function comprises one of a packet switch and a cell switch.

14. The system of claim 1, wherein the switch function comprises one of a packet-based and a cell-based network.

15. A method of handling plural media streams, each media stream comprising packets of media information, the method comprising:

executing plural types of media stream processing functions at plural processors;

routing the packets of the plural media streams to a sequence of the plural processors whereby the plural types of media stream processing functions are sequentially performed relative to the packets;

choosing a packet size for the packets to minimize overhead load on at least one of the plural processors without causing undue delay for a packet awaiting processing by the at least one of the plural processors.

16. The method of claim 15, further comprising choosing the packet size for a packet of media information to be 160 octets.

17. The method of claim 15, further comprising separating consecutive packets of a same media stream by a packet repetition interval.

18. The method of claim 17, further comprising choosing the packet repetition interval between consecutive packets of the same media stream to be 20 milliseconds.

19. The method of claim 15, wherein the number of plural media streams is nine.

20. The method of claim 15, wherein the plural media streams are one of plural voice channels and plural video channels.

21. The method of claim 15, further comprising asynchronously routing the packets of the plural media streams to a sequence of the plural processors.

22. The method of claim 21, further comprising, for the at least one of the plural processors, providing a queue for temporarily storing a packet received while the at least one of the plural processors performs its media stream processing function relative to another packet.

23. The method of claim 15, further comprising including at least one of the following as one of the plural types of media stream processing functions: speech coding; speech decoding; echo cancellation; tone sender; tone receiver; DTMF sender; DTMF receiver, conference call device (CCD); announcement machine; FAX modem; voice recognition; and U-lag/A-lag conversion; an interfacing functionality to an external network (such as TDM, ATM, IP and Frame Relay networks); video codec, text processing, modem for either circuit switched or packet switched data.

24. A method of handling plural media streams, each media stream comprising packets of media information, the method comprising:
  executing plural types of media stream processing functions at plural processors;
  routing the packets of the plural media steams to a sequence of the plural processors whereby the plural types of media stream processing functions are sequentially performed relative to the packets;
  choosing a packet size for the packets to minimize overhead load on at least one of the plural processors without causing undue delay for a packet awaiting processing by the at least one of the plural processors;
  wherein the overhead load includes operations of resuming and suspending execution of a media stream processing function for packets of different media streams.

25. A method of handling plural media streams each media stream comprising packets of media information, the method comprising:
  executing plural types of media stream processing functions at plural processors;
  routing the packets of the plural media streams to a sequence of the plural processors whereby the plural types of media stream processing functions are sequentially performed relative to the packets;
  choosing a packet size for the packets to minimize overhead load on at least one of the plural processors without causing undue delay for a packet awaiting processing by the at least one of the plural processors;
  providing an interface device to connect the system to a network wherein the packets of the plural media streams are transmitted synchronously, and using the interface device to perform a synchronization with respect to the packets which have been asynchronously routed through the system.

26. The method of claim 15, wherein the step of routing the packets of the plural media streams involves employing one of a packet switch and a cell switch to route the packets.

27. The method of claim 15, wherein the step of routing the packets of the plural media streams involves employing one of a packet based network and a cell based network to route the packets.

28. A media stream system which processes plural media streams, each media stream comprising packets of media information, the system comprising:
  plural processors, each of the plural processors executing at least one of plural types of media stream processing functions;
  a switch function which asynchronously routes the packets of the plural media streams to a sequence of the plural processors whereby the plural types of media stream processing functions are sequentially performed relative to the packets;
  wherein a packet size for the packets is chosen to be 160 octets.

29. The system of claim 28, wherein consecutive packets of a same media stream are separated by a packet repetition interval.

30. The system of claim 29, wherein the packet repetition interval between consecutive packets of the same media stream is 20 milliseconds.

31. The system of claim 28, wherein the number of plural media streams is nine.

32. The system of claim 28, wherein the plural media streams are one of plural voice channels and plural video channels.

33. The system of claim 28, wherein for at least one of the plural processors there is a queue for temporarily storing a packet received while the at least one of the plural processors performs its media stream processing function relative to another packet.

34. The system of claim 28, wherein at least one of the plural processors is a digital signal processor (DSP).

35. The system of claim 28, wherein the plural types of media stream processing functions include at least one of the following: speech coding; speech decoding; echo cancellation; tone sender: tone receiver; DTMF sender; DTMF receiver; conference call device (CCD); announcement machine; FAX modem; voice recognition; and U-lag/A-lag conversion; an interfacing functionality to an external network (such as TDM, ATM, IP and Frame Relay networks); video codec, text processing, modem for either circuit switched or packet switched data.

36. A media stream system which processes plural media streams, each media stream comprising packets of media information, the system comprising:
  plural processors, each of the plural processors executing at least one of plural types of media streams processing functions;
  a switch function which asynchronously routes the packets of the plural media streams to a sequence of the plural processors whereby the plural types of media stream processing functions are sequentially performed relative to the packets;
  wherein a packet size for the packets is chosen to be 160 octets;
  an interface device which connects the system to a network wherein the packets of the plural media streams are transmitted synchronously, wherein the interface device performs a synchronization with respect to the packets which have been asynchronously routed through the system.

37. The system of claim 28, wherein the switch function comprises one of a packet switch and a cell switch.

38. The system of claim 28, wherein the switch function comprises one of a packet-based and a cell-based network.

39. A media stream system which processes plural media streams, each media stream comprising packets of media information, the system having:
  plural processors, each of the plural processors executing at least one of plural types of media stream processing functions;
  a switch function which routes the packets of the plural media streams to a sequence of the plural processors whereby the plural types of media stream processing functions are sequentially performed relative to the packets;
  wherein a packet size for the packets is chosen to lower overhead load on at least one of the plural processors without causing undue delay for a packet awaiting processing by the at least one of the plural processors, and wherein the overhead load includes operations of resuming and suspending execution of a media stream processing function for packets of different media streams.

40. A method of handling plural media streams, each media stream comprising packets of media information, the method comprising:
  executing plural types of media stream processing functions at plural processors;
  routing the packets of the plural media streams to a sequence of the plural processors whereby the plural types of media stream processing functions are sequentially performed relative to the packets;
  choosing a packet size for the packets to reduce overhead load on at least one of the plural processors without causing undue delay for a packet awaiting processing by the at least one of the plural processors, wherein the overhead load includes operations of resuming and suspending execution of a media stream processing function for packets of different media streams.

41. The system of claim 39, wherein the packet size for a packet of media information is chosen to be 160 octets.

42. The system of claim 39, wherein consecutive packets of a same media stream being separated by a packet repetition interval.

43. The system of claim 42, wherein the packet repetition interval between consecutive packets of the same media stream is 20 milliseconds.

44. The system of claim 39, wherein the number of plural media streams is nine.

45. The system of claim 39, wherein the plural media streams are one of plural voice channels and plural video channels.

46. The system of claim 39, wherein the switch asynchronously routes the packets of the plural media streams to a sequence of the plural processors.

47. The system of claim 46, wherein for at least one of the plural processors there is a queue for temporarily storing a packet received while the at least one of the plural processors performs its media stream processing function relative to another packet.

48. The system of claim 39, wherein at least one of the plural processors is a digital signal processor (DSP).

49. The system of claim 39, wherein the plural types of media stream processing functions include at least one of the following: speech coding; speech decoding; echo cancellation; tone sender; tone receiver; DTMF sender; DTMF receiver; conference call device (CCD); announcement machine; FAX modem; voice recognition; and U-lag/A-lag conversion; an interfacing functionality to an external network (such as TDM, ATM, IP and Frame Relay networks); video codec, text processing, modem for either circuit switched or packet switched data.

50. The method of claim 40, further comprising choosing the packet size for a packet of media information to be 160 octets.

51. The method of claim 40, further comprising separating consecutive packets of a same media stream by a packet repetition interval.

52. The method of claim 51, further comprising choosing the packet repetition interval between consecutive packets of the same media stream to be 20 milliseconds.

53. The method of claim 40, wherein the number of plural media stems is nine.

54. The method of claim 40, wherein th plural media streams are one of plural voice channels and plural video channels.

55. The method of claim 40, her comprising asynchronously routing the packets of the plural media streams to a sequence of the plural processors.

56. The method of claim 55, further comprising, for the at least one of the plural processors, providing a queue for temporarily storing a packet received while the at least one of the plural processors performs its media stream processing function relative to another packet.

57. The method of claim 40, further comprising including at least one of the following as one of the plural types of media stream processing functions: speech coding; speech decoding; echo cancellation; tone sender; tone receiver, DTMF sender; DTMF receiver; conference call device (CCD); announcement machine; FAX modem; voice recognition; and U-lag/A-lag conversion; an interfacing functionality to an external network (such as TDM, ATM, IP and Frame Relay networks); video codec, text processing, modem for either circuit switched or packet switched data.

* * * * *